April 8, 1969   K. M. KOCH ET AL   3,437,333
SPRING SEAT

Filed Oct. 24, 1966

INVENTORS
KENNETH M. KOCH
WILLIAM E. RICE

BY
Strauch Nolan Neale Nies & Bronaugh
ATTORNEYS

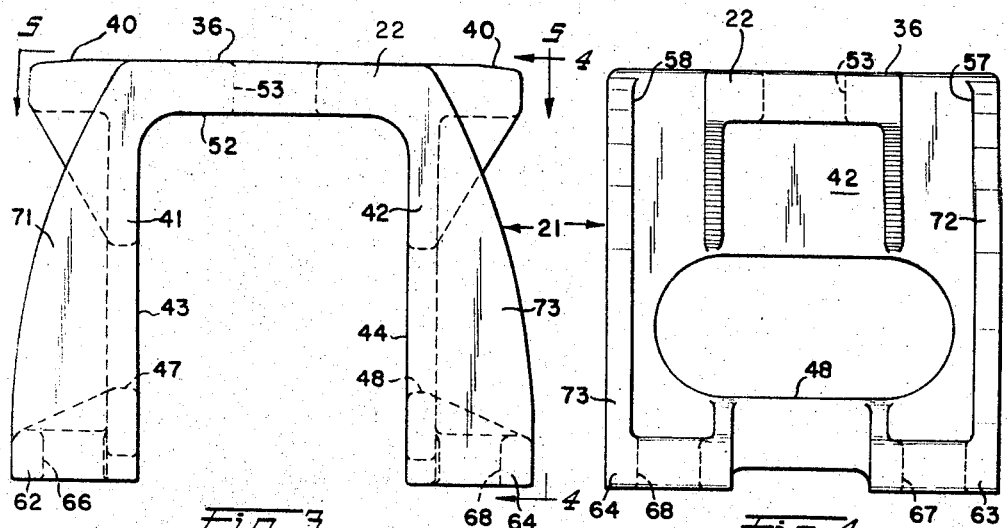
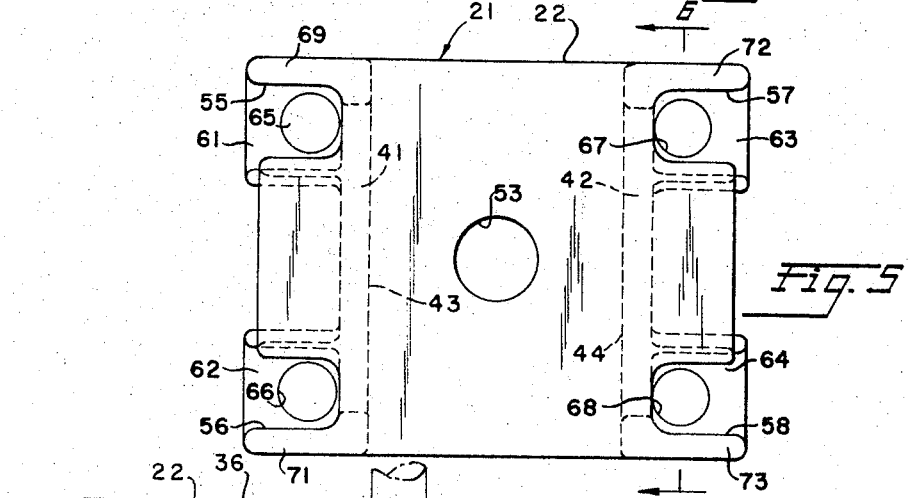
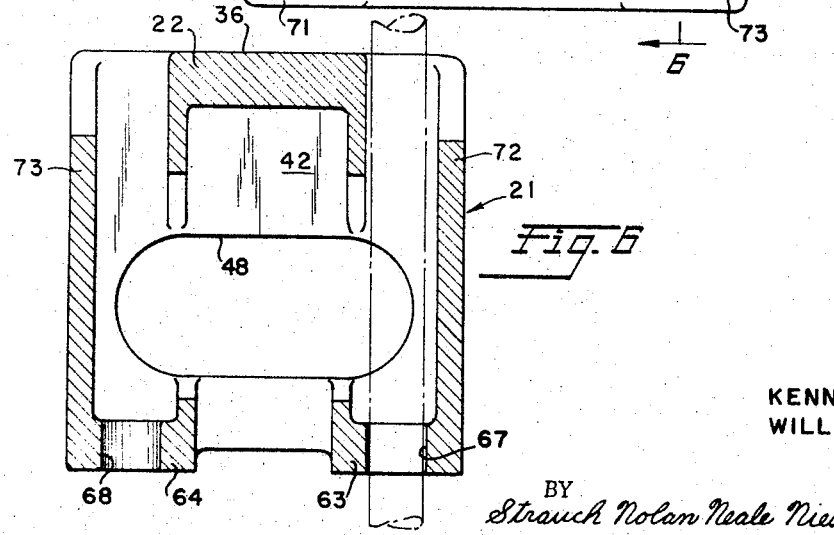

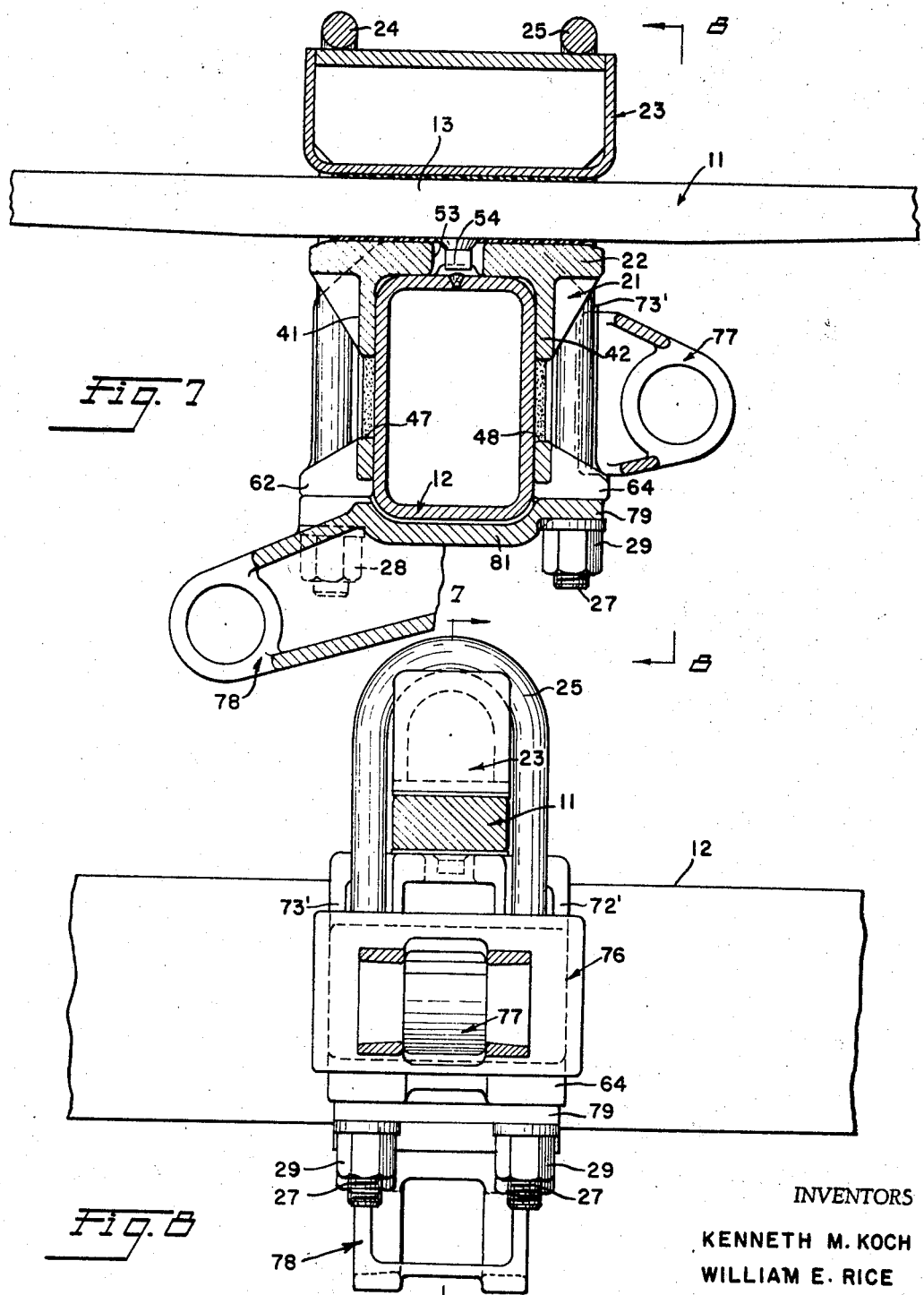

United States Patent Office 3,437,333
Patented Apr. 8, 1969

3,437,333
SPRING SEAT
Kenneth M. Koch, Dearborn, and William E. Rice, Ferndale, Mich., assignors to North American Rockwell Corporation, a corporation of Delaware
Filed Oct. 24, 1966, Ser. No. 588,879
Int. Cl. B60g 11/02; F16f 1/18
U.S. Cl. 267—52                                    4 Claims

ABSTRACT OF THE DISCLOSURE

A vehicle axle assembly in which a seat bracket is mounted on a hollow axle member having a substantially rectangular section spring seat region, with the seat bracket having a saddle for directly overlying the upper surface of the axle member at the seat region and parallel depending legs extending along the side surfaces of the axle member. The bracket legs have full surface engagement with and are welded directly to the axle member sides. A pressure plate overlies an intermediate portion of a leaf spring assembly and clamps the assembly upon the seat bracket saddle. U-bolt fastener means extend over the pressure plate and downwardly through the bracket in laterally spaced relation to the axle member sides, the U-bolts each having a bridge portion passing over the pressure plate and parallel legs extending downwardly on the same side of the axle member through vertically aligned recesses in the bracket. The lower ends of the boltlegs are threaded to receive nuts for engaging the lower ends of the bracket legs.

---

This invention relates to spring seats for fixedly mounting leaf springs on automotive vehicle axle beams or housings and is particularly concerned with spring seat structures wherein forces involved in tightening the usual U-bolt or like fasteners do not impose crush loads on the axle beams or housings.

The usual U-bolt fasteners at the spring seats for axle members either pass directly around the axle member, or they clamp two separate bracket or pressure plate members into the assembly. The forces involved in tightening the bolts are directly effective on the axle members. With the advent of hollow trailer axle beams and drive axle housings both having rectangular spring seat regions, some difficulty has been encountered in that when tightened sufficiently to secure leaf spring assembly tightly on the axle beam or housing the U-bolts may crush or deform the beam or housing walls thereby weakening the resistance to bending as well as resulting in later looseness during operation permitting the spring assembly to undesirably move relative to the axle.

It is the major object of the present invention to provide a novel spring seat structure which enables a leaf spring assembly to be adequately tightly fixedly secured upon the axle beam or housing without imposing damaging crush loads thereon as the usual U-bolts or like fasteners are drawn tight.

Another object of the invention is to provide a novel arrangement for fixing a leaf spring assembly to a hollow axle member such as a trailer axle beam or a drive axle housing having a rectangular cross section at the spring seat region wherein an inverted U-shaped bracket is welded onto the axle member and the U-bolts or like fasteners extend around a pressure plate on the upper side of the spring assembly and downwardly at opposite sides of the axle member to be secured at their lower ends to the bracket.

A further object of the invention is to provide a novel seat spring bracket structure, and other objects of the invention relate to novel structural details of that bracket.

Further objects will appear as the description proceeds in connection with the appended claims and the annexed drawings wherein:

FIGURE 3 is an elevation showing the spring seat bracket apart from the axle beam;

FIGURE 4 is an end view looking in the direction of line 4—4 of FIGURE 3;

FIGURE 5 is a top plan view of the bracket of FIGURE 3;

FIGURE 6 is a section through the bracket substantially on line 6—6 of FIGURE 5;

FIGURE 7 is a section similar to FIGURE 1 but showing torque rod attachment to the spring seat bracket; and FIGURE 8 is an elevation partly in section on line 8—8 of FIGURE 7.

The invention will be described for mounting a leaf spring assembly indicated at 11 upon a tubular trailer axle beam indicated at 12. The leaf spring assembly 11 may comprise a single tapered leaf as disclosed in U.S. Letters Patent No. 3,145,984, or a dual tapered leaf unit as disclosed in U.S. Letters Patent No. 3,053,527, or it may comprise a conventional multi-leaf assembly. The axle beam may be the hollow rectangular cross section beam disclosed in pending Ser. No. 483,550 filed Aug. 30, 1965, now abandoned and refiled Oct. 4, 1967 as Ser. No. 672,926, or it may be the beams disclosed in Buckendale Patent No. 2,685,479 or Schneider et al. Patent No. 2,674,783.

Figure 1:
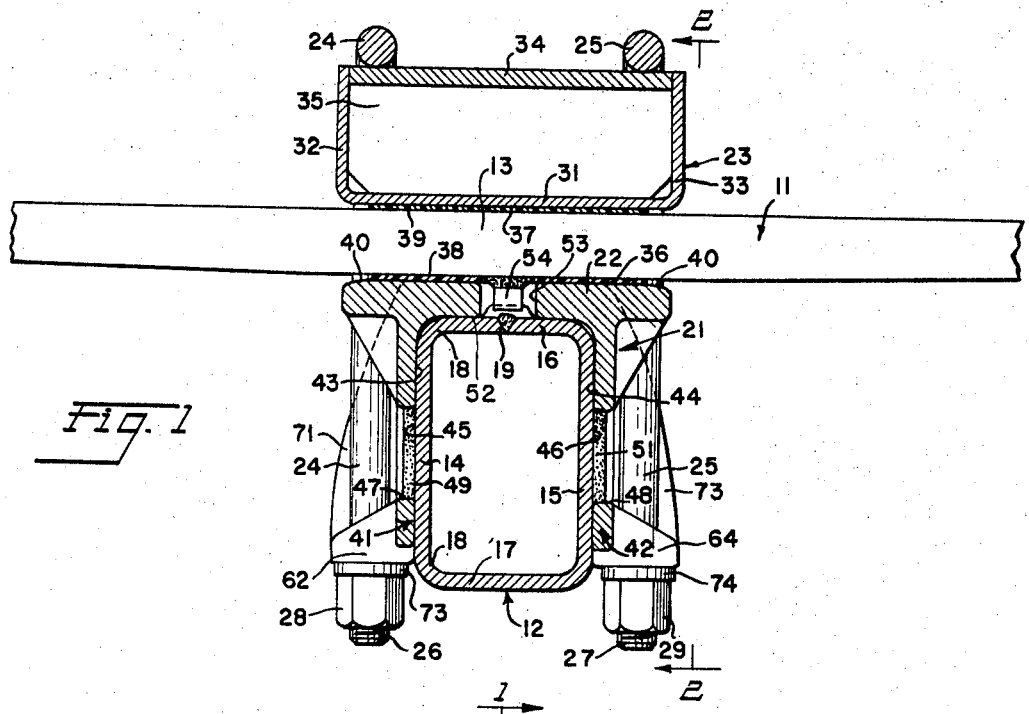
FIGURE 1 is a section on line 1—1 of FIGURE 2 showing the attachment of the spring seat to the axle beam according to a preferred embodiment of the invention.
Figure 2:
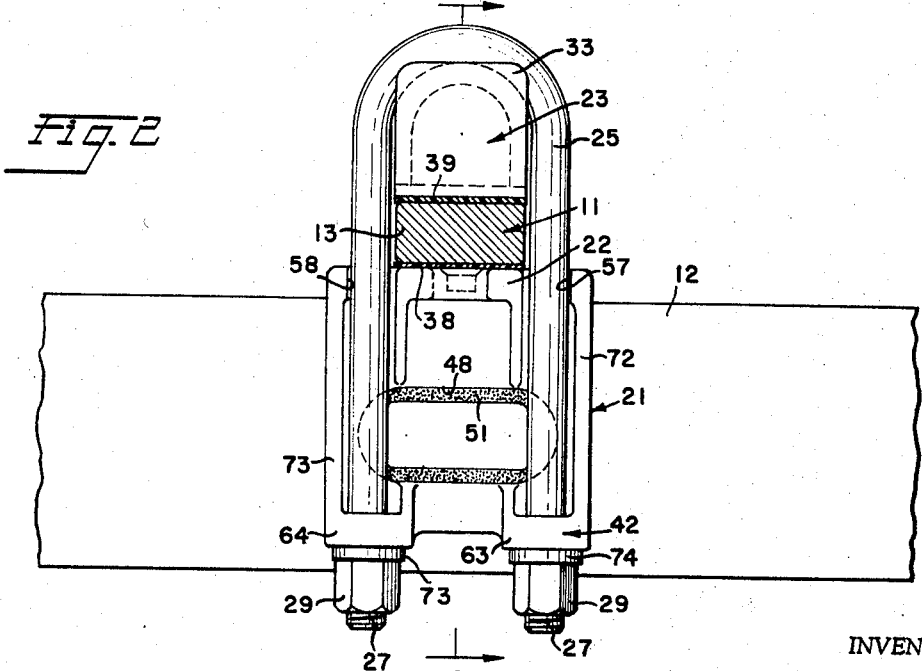
FIGURE 2 is an elevation partly in section looking in the direction of line 2—2 in FIGURE 1.

In any event the central region 13 of the leaf spring assembly 11 which is usually of substantially constant width and thickness is fixedly mounted on the axle beam 12. The opposite ends of spring assembly 11 (not shown) are attached conventionally to the vehicle frame. Axle beam 12, at least at the spring seat attachment region shown in FIGURES 1 and 2, is substantially rectangular with parallel vertical side walls 14 and 15 and parallel top and bottom walls 16 and 17 respectively. The corners 18 joining these walls are arcuate but essentially right angle junctures. The particular axle beam 12 shown is formed by bending a single sheet of suitable thickness steel about a longitudinal axis, joining opposite edges by a weld 19 and forging the illustrated spring seat corners.

A spring seat bracket 21 of novel structure is integrally secured to axle beam 12. Bracket 21 which is usually an integral casting is U-shaped with its saddle 22 overlying the horizontal top wall of the axle beam. The central region 13 of the spring assembly rests on saddle 22 and a pressure plate 23 is placed over the top of region 13. A pair of U-bolts 24 and 25 extend over the pressure plate and downwardly through the bracket at opposite sides of the axle beam. The lower threaded ends 26 and 27 carry nuts 28 and 29 respectively which when drawn tight clamp the spring assembly to the spring bracket without exerting crushing forces on the rectangular hollow beam.

Pressure plate 23 may be solid or may comprise a hollow box-like structure consisting of a U-shaped lower member 31 having vertical end walls 32 and 33 the upper ends of which are bridged by a welded plate 34. A solid metal pressure block 35 fills the space within member 31, and the corners of the end wall (see FIGURE 2) help retain the U-bolts against slippage during assembly and in operation. Plate 34 is arcuately formed to the shape of the U-bolts so that they extend smoothly therearound.

The upper flat surface 36 of bracket 21 and the lower flat surface 37 of pressure plate 23 are parallel in the assembly, and usually linear strips 38 and 39 of smooth plastic are interposed between these surfaces and the spring assembly to reduce fretting and stress concentrations.

As shown in FIGURE 1, the opposite edges of the surface 36, indicated at 40 are inclined downwardly slightly to permit flexing the spring assembly outwardly of the fixed region 13 during vehicle operation.

Referring to FIGURES 3–6, the bracket 21 comprises saddle 22 and two parallel side legs 41 and 42. The flat parallel inner surfaces 43 and 44 of these legs are smooth and adapted to snugly engage the flat parallel outer side surfaces 45 and 46 of the axle beam when saddle 22 rests on top wall 16.

Legs 41 and 42 are formed with through slots 47 and 48 and, when bracket 21 is seated on beam 12, the bracket is integrally welded to the beam as by the weld areas 49 and 51 in those slots shown in FIGURES 1 and 2. These welds are so located that the welding heat does not produce detrimental side effects on beam structure.

Saddle 22 of the bracket has a flat bottom surface 52 where it overlies the beam top wall, and a central aperture 53 is formed in saddle 22 to receive (FIGURE 1) a downwardly projecting usually integral or welded stud 54 on the bottom surface of the spring assembly.

As shown in FIGURE 5 the saddle ends where they project beyond legs 41 and 42 are formed with outwardly open recesses indicated at 55, 56, 57 and 58; and four corresponding flanges 61, 62, 63 and 64 project outwardly at right angles from the lower ends of the bracket arms, the flanges being formed with openings 65, 66, 67 and 68 respectively in alignment with associated recesses. At the outer bracket corners external re-enforcing webs 69, 70, 71 and 72 integrally connect the saddle 22 to the flanges.

In the assembly as shown in FIGURES 1 and 2, the U-bolt legs project downwardly through the side recesses and flange openings of the bracket for attachment of the nuts 28 and 29. Usually lockwashers at 73 and 74 are interposed between the nuts and the bracket leg flanges in the assembly.

Bracket 21 has previously been welded in place on the axle beam. The parallel U-bolt legs pass alongside but in laterally spaced relation to the sides of the axle beam, and the tightening of nuts 28 and 29 to properly secure the medial region of the spring assembly to the bracket imposes no crushing or collapsing forces on the hollow axle beam which therefore retains its original shape and resistance to bending in the assembly.

In assembly, bracket 21 is placed in proper position on the seat spring region of the hollow axle member with legs 41 and 42 extending closely slidably down the sides of the housing member and with saddle 22 resting on the top wall 16. Now the bracket is made integral with the axle member by welding through slots 47 and 48. The leaf spring assembly is placed over the saddle, oriented by stud 54 extending into saddle opening 53, and the pressure plate 23 placed on the top of the spring leaf assembly. The U-bolts 24 and 25 are dropped into place over the pressure plate, their legs extending through the recesses and flange openings of bracket 21, and the nuts and lockwashers placed and drawn tight.

As the nuts are drawn tight the force reactions are confined to the bracket and pressure plate structure and the U-bolts, and none are transmitted to the axle member.

FIGURES 7 and 8 show essentially the same spring seat structure modified for mounting of torque rod brackets.

At the right in FIGURE 7 and as shown in FIGURE 8, where the torque rod mechanism is of the type wherein the centerline of the rod horizontally intersects the centerline of axle beam 12, the base plate 76 of the torque rod bracket 77 is welded in bridging relation across the corner re-enforcing webs 72' and 73' at the proper side. The webs here are sufficiently outwardly projected as shown that there is space for the U-bolt legs to freely pass down between plate 76 and bracket leg 42 in the assembly.

Where the torque rod mechanism is of the type that attaches forwardly or rearwardly below the vehicle axle centerline, the torque rod bracket 78 is formed with a base plate 79 having holes to receive the lower ends of the U-bolts 24 and 25, and tightening of nuts 28 and 29 secures torque rod bracket 78 upon the axle structure. The central portion 81 of plate 79 is depressed as shown in FIGURE 7 so as to remain spaced from the bottom wall 17 of the axle beam. In these foregoing constructions the reaction forces arising from tightening of nuts 28 and 29 are not transmitted through plate 79 to the axle beam, and during operation the forces incident to torque transmission are not imposed on the axle beam.

Thus, the invention provides a considerably improved spring seat structure particularly for a rectangular tubular vehicle axle member which effectively prevents the introduction of undesirable clamp-up forces into the axle beam or housing and allows the simultaneous optional attachment of torque rod brackets without alteration of the spring seat structure.

The invention may be embodied in other forms without departing from the spirit and essential characteristic thereof and the present embodiments are to be considered in all respects as illustrative only and not restrictive.

What is claimed and desired to be secured by Letters Patent is:

1. In a vehicle axle assembly of the type wherein a hollow axle member has a substantially rectangular section spring seat region, a seat bracket mounted upon said axle member comprising a saddle for directly overlying the upper surface of said axle member at said region and parallel depending legs extending along the side surfaces of the axle member, said bracket legs having full surface engagement with and being internally welded directly to the side walls of said axle member, means for clamping an intermediate portion of a leaf spring assembly upon said saddle comprising a pressure plate overlying said spring portion and fastener means extending over said pressure plate and downwardly through said bracket in laterally spaced relation to said axle member sides, said fastener means comprising U-bolts each having a bridge portion passing over said pressure plate and parallel legs extending downwardly on the same side of said axle member parallel to said axle member sides and through vertically aligned recesses in said bracket, the lower ends of said bolt legs being threaded to receive nuts for engaging the lower ends of said bracket legs, said bracket legs being externally formed with aligned upper recesses and bottom openings for receiving clamping U-bolts of said fastener means.

2. In a vehicle axle assembly of the type wherein a hollow axle member has a substantially rectangular section spring seat region, a seat bracket mounted upon said axle member comprising a saddle for directly overlying the upper surface of said axle member at said region and parallel depending legs extending along the side surfaces of the axle member, said bracket legs having full surface engagement with and being welded directly to said axle member sides, means for clamping an intermediate portion of a leaf spring assembly upon said saddle comprising a pressure plate overlying said spring portion, fastener means extending over said pressure plate and downwardly through said bracket in laterally spaced relation to said axle member sides, said fastener means comprising U-bolts each having a bridge portion passing over said pressure plate and parallel legs extending downwardly on the same side of said axle member parallel to said axle member sides and through vertically aligned recesses in said bracket, the lower ends of said bolt legs being threaded to receive nuts for engaging the lower ends of said bracket legs, and a torque rod end attachment bracket welded to a bracket leg laterally outside said fastener means.

3. In a vehicle axle assembly of the type wherein a hollow axle member has a substantially rectangular section spring seat region, a seat bracket mounted upon said axle member comprising a saddle for directly overlying the upper surface of said axle member at said region and parallel depending legs extending along the side surfaces of the axle member, said bracket legs having full surface engagement with and being welded directly to said axle member sides, means for clamping an intermediate portion of a leaf spring assembly upon said saddle comprising a pressure plate overlying said spring portion and fastener means extending over said pressure plate and downwardly through said bracket in laterally spaced relation to said axle member sides, said fastener means comprising U-bolts each having a bridge portion passing over said pressure plate and parallel legs extending downwardly on the same side of said axle member parallel to said axle member sides and through vertically aligned recesses in said bracket, the lower ends of said bolt legs being threaded to receive nuts for engaging the lower ends of said bracket legs, and a torque rod bracket mounted on said seat bracket below said axle member and out of direct contact with said axle member, said U-bolt legs extending through said torque rod bracket and said torque rod bracket being clamped against the lower ends of the seat bracket legs by said nuts.

4. In a vehicle axle assembly of the type wherein a hollow axle member has a substantially rectangular section spring seat region, a seat bracket mounted upon said axle member comprising a saddle for directly overlying the upper surface of said axle member at said region and parallel depending legs extending along the side surfaces of the axle member, said bracket legs having full surface engagement with and being welded directly to the said axle member sides, means for clamping an intermediate portion of a leaf spring assembly upon said saddle comprising a pressure plate overlying said spring portion and fastener means extending over said pressure plate and downwardly through said bracket in laterally spaced relation to said axle member sides, said fastener means comprising U-bolts each having a bridge portion passing over said pressure plate and parallel legs extending downwardly on the same side of said axle member parallel to said axle member sides and through vertically aligned recesses in said bracket, the lower ends of said bolt legs being threaded to receive assembly clamping nuts, and said bracket legs being externally formed with aligned upper recesses and bottom openings for receiving clamping U-bolts of said fastener means.

References Cited

UNITED STATES PATENTS

| | | | |
|---|---|---|---|
| 1,926,346 | 9/1933 | Mogford et al. | 267—52 |
| 2,264,174 | 11/1941 | Crump et al. | 267—66 |
| 2,880,991 | 4/1959 | Ward | 267—67 |
| 3,058,740 | 10/1962 | Harbers et al. | 267—52 |
| 3,386,724 | 6/1968 | Tantlinger et al. | 267—52 |

ARTHUR L. LA POINT, *Primary Examiner.*